Oct. 6, 1925. 1,556,279
G. W. ALLEN
TOOL FOR FACILITATING THE ROLLING OF PNEUMATIC TIRE INNER TUBES
Filed May 27, 1924

G. W. Allen,
Inventor

By Clarence A. O'Brien.
Attorney

Patented Oct. 6, 1925.

1,556,279

UNITED STATES PATENT OFFICE.

GEORGE W. ALLEN, OF INDIO, CALIFORNIA.

TOOL FOR FACILITATING THE ROLLING OF PNEUMATIC-TIRE INNER TUBES.

Application filed May 27, 1924. Serial No. 716,250.

*To all whom it may concern:*

Be it known that I, GEORGE W. ALLEN, a citizen of the United States, residing at Indio, in the county of Riverside and State of California, have invented certain new and useful Improvements in a Tool for Facilitating the Rolling of Pneumatic-Tire Inner Tubes, of which the following is a specification.

This invention relates generally to the art of pneumatic tires for vehicles, and has more particular reference to a tool for facilitating the rolling of the tire inner tube, whereby the same may be placed in containers or stored away in small compass.

The primary object of the invention is to provied a tool of the above character, wherein an inner tube may be rolled into a relatively small compass and without any great difficulty as is now the case in the known methods of rolling or folding pneumatic tire inner tubes.

It is an additional and important object to provide a tool for this purpose that is extremely simple in construction, and one that may be manufactured and marketed at extremely small cost, and wherein the use of the same requires practically no skill on the part of the user.

With the foregoing and other objects in view as the nature of the invention will be better understood, the same comprises the novel form of a tool hereinafter more fully described, shown in the accompanying drawing and claimed.

In the drawing wherein like reference characters indicate corresponding parts throughout the several views.

Figure 2:
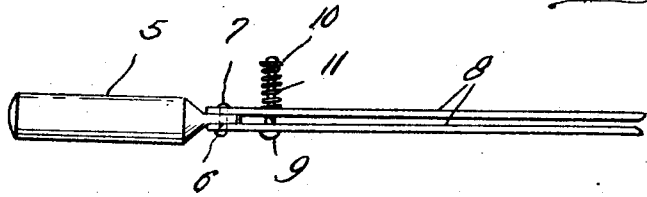
Fig. 2 is a plan view of a tool constructed in accordance with the present invention.

Now, having reference to the drawing, and particularly to Fig. 2, my novel tool constitutes the provision of a handle member 5 of any desired form, the same preferably consisting of a bar of wood or other material preferably circular in cross section. This handle is formed at its front end with a flat ear 6, in the same horizontal plane as the handle, and through said ear extends an opening.

Rigidly secured to the opposite sides of said handle ear 6 through the medium of a rivet 7 are relatively elongated metallic fingers 8 that also extend in the same horizontal plane with the handle 5, and are obviously provided at their attached ends with openings for registration with the opening in the ear 6 to actuate said securing rivet 7.

These fingers 8 are preferably of metal, and in the use of the tool in a manner hereinafter described it will be a tendency for the same to move away from each other. For preventing undue movement of these fingers with respect to each other, one of the same carries a relatively elongated laterally extending pin 9 adjacent its attached end that extends through an opening in the other of said fingers. Surrounding an abutment 10 upon the outer end of this pin and the adjacent finger 8 is an expansible spring 11 that normally maintains the fingers in close relation, and returns the same to normally respective positions after the same have been forced apart during use of the tool.

Figure 1:
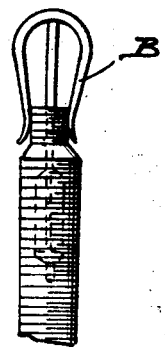
Fig. 1 is a fragmentary elevational view of a pneumatic tire inner tube inflating valve, disposed within which is a valve displacement member necessary for use when employed in conjunction with the use of the present invention for obviously maintaining the inflating valve of the tube in an open position during the rolling of the tube, whereby the air may escape freely therefrom.
Figure 3:
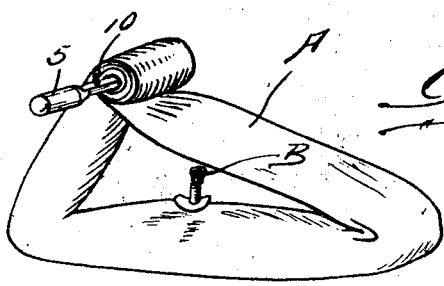
Fig. 3 is a perspective view of a pneumatic tire inner tube, the same being in a partially rolled condition, through the medium of the present tool.

It will be apparent that in actual use, the inner tube A is forced between the fingers 8 after which the tool is rotated, for rolling the tube upon the tool in a manner as shown in Figure 3. For allowing displacement of the air in the tube during the rolling thereof, a desirable form of valve displacement member B, Figures 1 and 3, is employed.

It will thus be seen that I have provided a highly novel and efficient form of tool for facilitating the rolling of pneumatic tire inner tubes, and even though I have herein shown and described the most practical embodiment of the invention with which I am at this time familiar, it is nevertheless to be understood that minor changes may be made in the invention without departing from the spirit and scope of the appended claim.

Having thus described my invention, what I claim as new, and desire to secure by Letters Patent is:

In a tool for facilitating the rolling of pneumatic tire inner tubes, a handle member, a pair of spaced parallel elongated fingers secured to said handle and between which the inner tube is adapted to be extended, a bolt fixed at one end to a portion of one finger and extending through the other finger, and a spring about said bolt for bearing against the finger through which the bolt projects for holding this last-mentioned finger normally parallel with the other finger.

In testimony whereof I affix my signature.

GEORGE W. ALLEN.